(No Model.) 2 Sheets—Sheet 1.

G. E. & C. W. PURPLE.
TROLLEY FOR ELECTRIC CARS.

No. 480,240. Patented Aug. 2, 1892.

Witnesses:
J. Jessen
F. S. Lyon

Inventors:
George E. Purple
Charles W. Purple
By Paul & Merwin attys.

(No Model.) 2 Sheets—Sheet 2.

G. E. & C. W. PURPLE.
TROLLEY FOR ELECTRIC CARS.

No. 480,240. Patented Aug. 2, 1892.

Witnesses:
J. Jensen
F. S. Lyon

Inventors
George E. Purple
Charles W. Purple
By Paul & Morrein attys.

UNITED STATES PATENT OFFICE.

GEORGE E. PURPLE AND CHARLES W. PURPLE, OF MINNEAPOLIS, MINNESOTA; SAID GEORGE E. PURPLE ASSIGNOR TO SAID CHARLES W. PURPLE.

TROLLEY FOR ELECTRIC CARS.

SPECIFICATION forming part of Letters Patent No. 480,240, dated August 2, 1892.

Application filed September 8, 1891. Serial No. 405,138. (No model.)

*To all whom it may concern:*

Be it known that we, GEORGE E. PURPLE and CHARLES W. PURPLE, both of Minneapolis, in the county of Hennepin and State of Minnesota, have invented certain Improvements in Trolleys for Electric Cars, of which the following is a specification.

This invention relates to improvements in trolleys for electric cars; and the object we have in view is to provide a trolley with means whereby it will be prevented from jumping off the wire, while at the same time permitting it to be removed from the wire when desired and also permitting it to freely pass the clamps by which the wire is supported or to pass splices or switches.

The invention consists generally in a trolley-wheel supported upon a suitable yoke that is provided with spring-controlled dogs or fingers that project over the wheel, so as to prevent the wheel from jumping off the wire.

The invention consists, further, in providing the said fingers or dogs with spring-controlled supporting devices that enable the dogs to yield or turn out of the way when the trolley passes wire-supporting clamps or other devices connected with the wire.

The invention consists, further, in the construction and combination hereinafter described, and particularly pointed out in the claims.

Figure 1:
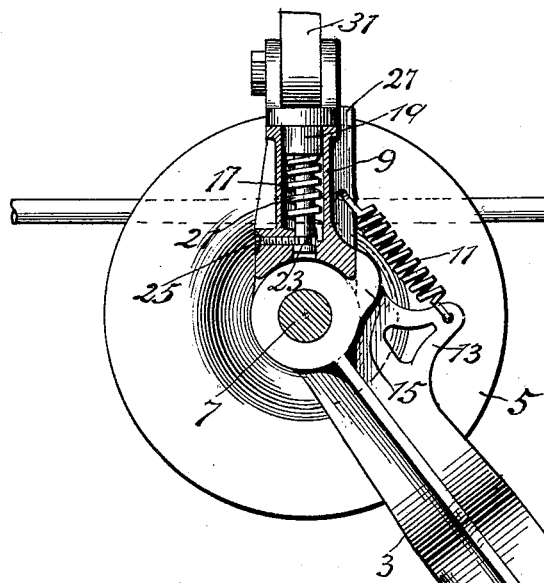
Figure 2:
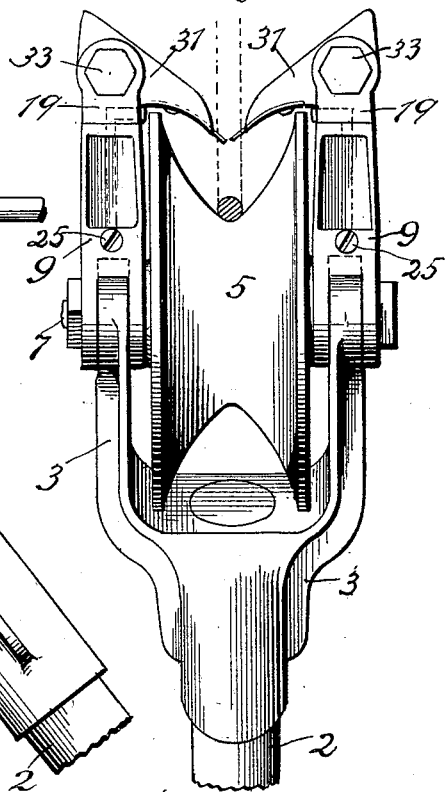
Figure 6:
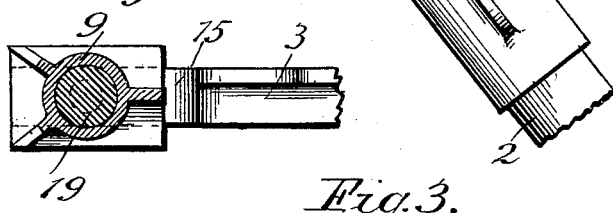
Figure 3:
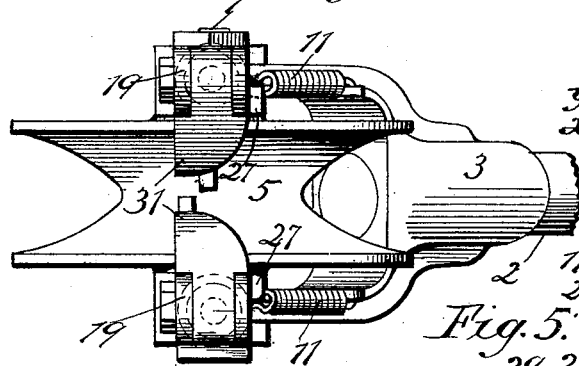
Figure 4:
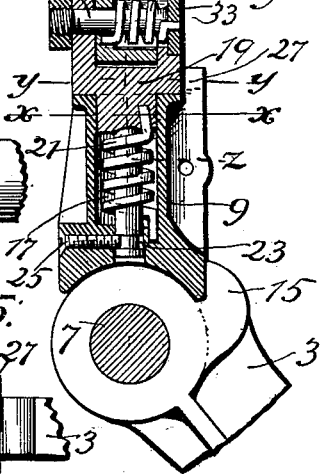
Figure 5:
Figure 7:
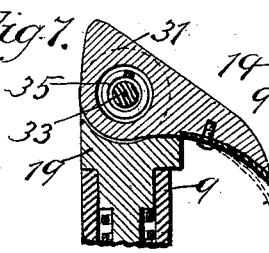
Figure 8:
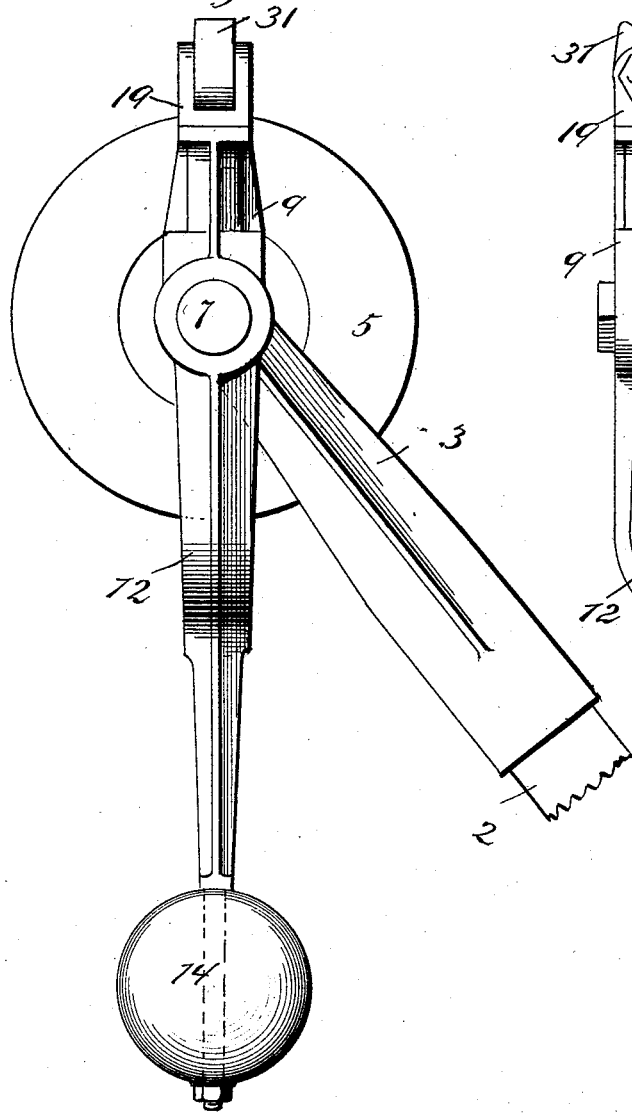
Figure 9:
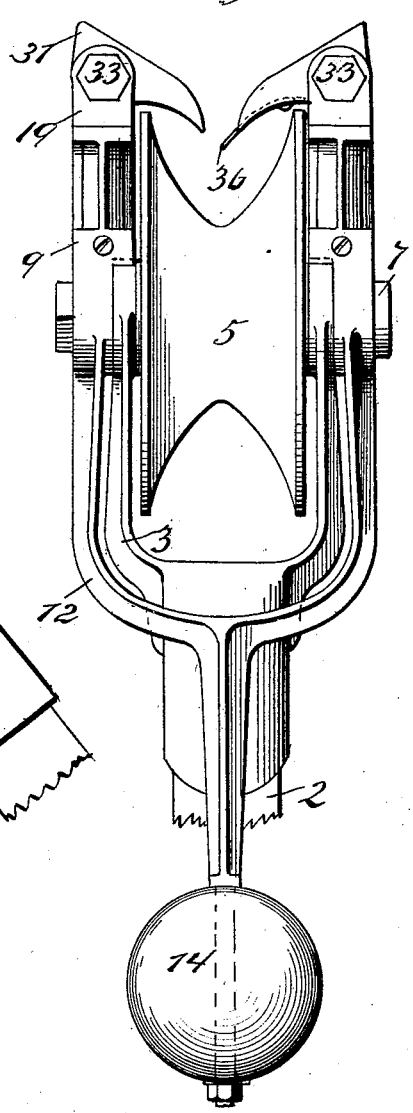

In the accompanying drawings, forming a part of this specification, Figure 1 is a side elevation, partly in section, of a trolley embodying our invention. Fig. 2 is an end elevation of the same. Fig. 3 is a plan view. Fig. 4 is a detail section through the arm that supports the spring-controlled dog. Fig. 5 is a detail section on the line *y y* of Fig. 4. Fig. 6 is a detail section on the line *x x* of Fig. 4. Fig. 7 is a detail section on the line *z z* of Fig. 4. Figs. 8 and 9 are respectively rear and side views of our trolley, showing a pendulum-weight substituted for the spring of the other figures.

In the drawings, 2 represents a portion of a trolley-pole, 3 the yoke arranged upon the upper end thereof, and 5 the trolley-wheel mounted upon an axle 7, secured in bearings in said yoke. These parts are all of ordinary or any preferred construction. Secured upon the axle 7 at each side of the wheel is an upright arm 9. Each of these arms is preferably provided with a forked lowered end that embraces a branch of the trolley-yoke. The axle 7 passes through this arm, and thereby each of said arms is pivotally secured upon said axle. A spring 11 is connected to said arm and also to the yoke, preferably to a projection 13 thereon. The yoke is also provided with a stop-lug 15, which is engaged by said arm and which prevents the spring from moving the arm beyond a vertical position. Said arm is provided with a vertical socket 17, in which is mounted a post 19. A spring 21 is arranged upon said post within said socket and has one end connected to the post 19 and the other end connected to said arm. The lower end of the post is preferably provided with a circular groove 23, and a screw 25 is arranged in said arm and engages the groove from the lower end of the said post. The arm 9 is provided with a lug 27, that is adapted to be engaged by a shoulder 29 on said post 19, and the spring 21 tends to hold the post with the shoulder 29 in engagement with said lug 27 and to return it to this position after it has been turned into any other position. A dog or finger 31 is pivotally supported upon the upper end of each of said posts 19, and said dogs are arranged so as to project over the top of the wheel, as shown in Figs. 2 and 3, when said posts are in their normal positions. The upper surfaces of the dog are preferably inclined toward each other, and their inner ends are separated by a space sufficiently wide to permit the wire to pass between them. With this arrangement if the trolley is brought into position so that the upper surface of either of said dogs strikes against the wire it will slide over said wire and the wire will pass between the inner ends of the dogs, and the wheel will then be permitted to come into contact with the wire. The under surfaces of the dogs are curved outward, so that in case the wire strikes against the under side of either of said dogs it will be directed outward or toward the edge of the wheel, and the wheel cannot jump off the wire unless it drops directly downward, so as to permit the wire to pass through the narrow space between the ends of said dogs. Each of said dogs is mounted upon a pivot pin or bolt 33 in the upper end of the post 19, and a spring 35 is arranged from said pivot-pin with one end engaging said pin and the other end engaging said dog. The spring is preferably connected to the head of said pin, which is preferably polygonal in form and engages a corresponding opening in said post. By this means the pin may be turned so as to get the desired tension upon said spring and then be pushed into place, so as to bring said head into engagement with the opening in the post, or any other suitable means may be provided for adjusting the tension of the spring. By this means it will be seen that the trolley is prevented from jumping off the wire and that in case it is necessary to remove it from the wire by pulling down on the yoke either of said dogs will yield sufficiently to pass the wire. In case the trolley is to be put onto the wire it is allowed to move up, so that the upper surface of either of said inclined dogs strikes the wire, which will then slip between the dogs and engage said wheel. When the trolley is in use, as the car moves along the dogs 31 will strike the clamps or supporting devices that support the wire and will yield sufficiently to pass such devices. For this purpose the dogs are preferably beveled off in front, as shown in Fig. 3. In case any extraordinary strain is brought upon said dogs on the posts 19 the arms 9 will yield, turning upon the axis 7, so as to permit the dogs and arms to pass any obstruction that they may encounter.

Instead of using the springs 11 on the arms 9 we may construct the said arms integrally with a depending yoke 12, having thereon a weight 14, which holds said arms in a vertical position, as shown in Figs. 8 and 9. We also may provide the dogs or fingers 31 with the spring-tips 36, which permit the wire to pass between the dogs, but keep it from jumping out through the space between them.

The details of construction and the location and arrangement of the various springs may be varied without departing from our invention.

We claim as our invention—

1. The combination, in a trolley device, of the trolley-wheel and the supporting-fork thereof with a spring-controlled dog or bill arranged on each side thereof, said dogs extending across the top of the wheel and meeting over the middle thereof, said dogs being so pivoted and arranged that the inner ends thereof may yield backwardly and upwardly, substantially as described.

2. The combination, with a trolley-wheel and its supporting-yoke, of arms pivotally supported upon the axis of said wheel, a yielding device or devices connecting said arms with said yoke, and spring-controlled dogs carried by said arm, substantially as described.

3. The combination, with the trolley-wheel and its yoke, of the spring-controlled arms mounted upon the axle of the trolley-wheel, spring-controlled posts mounted upon said arms, and spring-controlled dogs mounted upon said posts and projecting toward each other over said wheel.

4. The combination, with the trolley-wheel and its supporting-yoke, of the dogs provided with inclined upper surfaces and projecting over said wheel and means for supporting said dogs.

5. The combination, with the trolley-wheel and its supporting-yoke, of the arms pivoted upon the axis of said wheel, posts pivotally supported upon said arms, and the inclined dogs pivoted upon said posts and projecting over said wheel, substantially as described.

In testimony whereof we have hereunto set our hands this 24th day of August, 1891.

GEORGE E. PURPLE.
CHAS. W. PURPLE.

In presence of—
A. M. GASKILL,
F. S. LYON.